Figure 1:
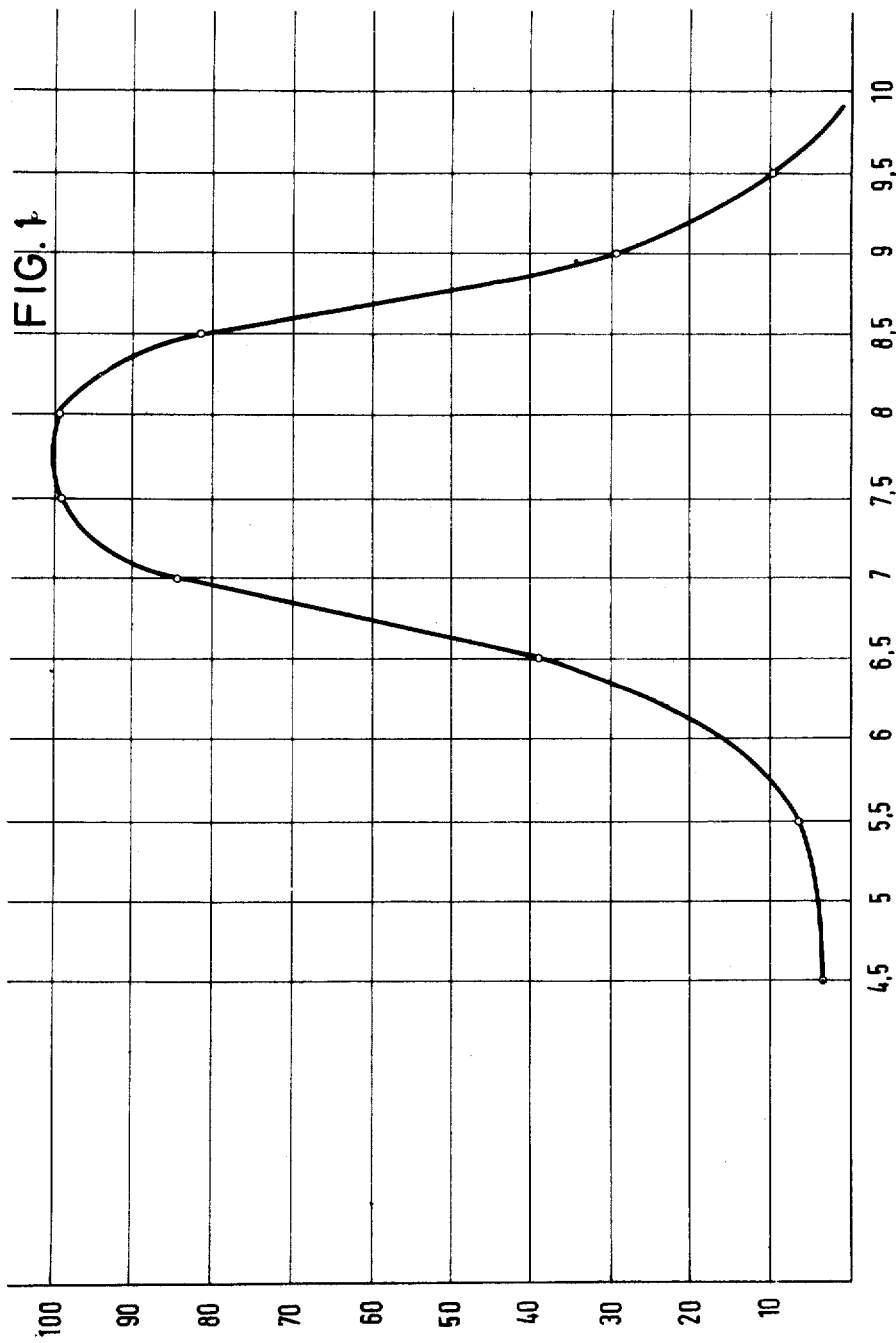

United States Patent [19]
Craveri et al.

[11] 3,898,133
[45] Aug. 5, 1975

[54] PROCESS OF PREPARING AN ENZYME WITH LIPOLYTIC ACTIVITY

[75] Inventors: Renato Craveri, Milan; Pier Luigi Manachini, Monzese; Fabrizio Aragozzini, Milan, all of Italy

[73] Assignee: Societa' Italiana Resine S.I.R. S.p.A., Milan, Italy

[22] Filed: May 3, 1973

[21] Appl. No.: 357,054

[30] Foreign Application Priority Data
May 3, 1972 Italy................................ 023850/72

[52] U.S. Cl.................. 195/66 R; 195/65; 195/62
[51] Int. Cl.² ........................................ C12D 13/10
[58] Field of Search...................... 195/62, 65, 66 R

[56] References Cited
UNITED STATES PATENTS
3,431,175   3/1969   Arima et al. .......................... 195/62
3,649,455   3/1972   Abe et al. ............................ 195/66 R

*Primary Examiner*—Lionel M. Shapiro
*Attorney, Agent, or Firm*—Sughrue, Rothwell, Mion, Zinn & Macpeak

[57] ABSTRACT

Enzyme preparations with lipolytic activity are produced by culturing a microorganism of the genus Myriococcum, I.P.V. F-520, (ATCC No. 20374) in an aqueous nutrient medium under aerobic conditions.

6 Claims, 4 Drawing Figures

PROCESS OF PREPARING AN ENZYME WITH LIPOLYTIC ACTIVITY

The invention concerns enzyme preparations with lipolytic activity, techniques for their production, and their use.

The enzyme preparations of the invention exhibit high lipolytic activity. Their pH optimum lies in the range of 7 to 8.5, and their temperature optimum at 50° to 60°C. At about 45°C and in a pH range between about 4.5 and 8.5 these preparations are stable for at least 60 minutes.

The process for the production of the enzyme preparations with lipolytic activity showing a pH optimum in the range of 7 to 8.5 and a temperature optimum of 50° to 60°C according to the invention is characterized in that a microorganism of the genus Myriococcum, I.P.V. F-520 (ATCC n.20374), is grown under aerobic conditions in a nutrient medium containing carbon and nitrogen and mineral salts, and the enzyme preparation is isolated from the culture broth.

The cultivation is preferably performed at temperatures of about 38° to 45°C, at pH values of about 7 to 8.5, and with an air supply of about 0.2 to 1 litre/litre/minute with stirring. The duration of cultivation is optimally 48 to 90 hours.

The above-mentioned microorganism used in the process of the invention belongs to the thermophilic Eumycetes. It was isolated from garden soil and subsequently grown on agar containing malt or potato infusion, glucose, and yeast extract. The strain used in this invention was deposited in the microorganism collection of the "Istituto di Patologia Vegetale della Universita degli Studi di Milano" and registered under No. I.P.V. F-520 (ATCC n.20374). This strain exhibits the following properties:

Colonies: After 4 to 5-day growth on an agar medium at 43°C the colonies formed show a cotton-like, extensive growth which consists of a yellowish-white vegetative mycelium and a whitish air mycelium.

Morphology: The mycelium consists of branched, septate hyphae of various diameters between 3 and 12–15 $\mu$. In time, there appear spherical formations of more or less dark-brown to blackish colouration in the mature state, which can reach a diameter of 200–250 $\mu$. These formations have walls of a wrinkled structure. They can be identified as ascocarps but ascospores do not develop in all cases. A typical conidial reproduction phase cannot be observed. Generally, reproduction occurs via fragmentation of the hyphae or via ascospores which are released after a break in the fruit body. On the basis of its properties, the strain used in the invention is classified as belonging to the genus Myriococcum.

Growth on various agar nutrient media after 6-day incubation at 43°C

| Agar nutrient medium | Growth |
| --- | --- |
| Malt | Good |
| Potato + glucose + yeast extract | Good |
| Soy beans | Good |
| Oat meal | Good |
| Rice infusion | Good |
| Starch + yeast extract | Satisfactory |
| Glucose + yeast extract | Satisfactory |
| Meat extract + glucose | Satisfactory |
| Asparagine + glycerol | Satisfactory |
| Milk | Satisfactory |

-Continued

Growth on various agar nutrient media after 6-day incubation at 43°C

| Agar nutrient medium | Growth |
| --- | --- |
| Meat extract | scarce |
| Meat extract + yeast extract | scarce |
| Manure infusion | scarce |
| Czapek's agar | Very scarce |

Growth temperatures: Minimum about 30°C, optimum 40 to 45°C, maximum about 55°C.

Oxygen requirement: Aerobic growth.

pH Conditions: Good growth in the pH range 6 to 8.

Enzyme activities: Lipolytic, proteolytic, rennet activity, amylase activity.

Utilization of carbon sources: Good utilization of glucose, fructose, galactose, xylose, maltose, lactose, dextrin, starch, glycerol, and mannitol; moderate utilization of sucrose and inulin.

Utilization of nitrogen sources: Good utilization of peptones, asparagine, urea, potassium nitrate, and ammonium sulphate.

In the manufacturing process of enzyme preparations with lipolytic activity according to the present invention an inoculum is first prepared. For this purpose a mycelium suspension obtained from an agar slant of the I.P.V. F-520 strain is inoculated into an Erlenmeyer flask containing the corresponding liquid nutrient medium. Conventional nutrient media on a flour basis can be used. Special examples of carbon sources are starch, dextrin, maltose, lactose, or other purified carbohydrates or those contained in various kinds of flour. Such carbohydrates are contained in maize, soy beans, peanuts, cotton seed, cereal bran, or in other products, such as whey, filter cakes obtained during the production of vegetable oils, molasses, or vegetable oils from various seeds.

Products from the above-mentioned kinds of flour, other protein products, their hydrolysis products, or inorganic nitrogen sources are suitable as nitrogen sources. Various mineral salts, such as phosphates, magnesium sulphate, zinc sulphate, or calcium chloride can be added.

The fermentation broth formed in the flask is used as an inoculum for a fermentation vessel which contains a nutrient medium of essentially the same composition, or one of a different composition. The fermentation broth in this fermentation vessel is again used as the inoculum for several other fermentation vessels.

Conventional additives, for example antifoaming agents, can be added to the nutrient media. The fermentation broth obtained after the fermentation is complete is separated by centrifuging or filtration. Following conventional concentration and purification steps, one obtains the enzyme product of the invention from the filtrate. Concentration of the enzyme product can easily be carried out by precipitation with salts, such as ammonium sulphate or chlorides, tannin, or organic solvents such as acetone or ethanol.

Figure 2:
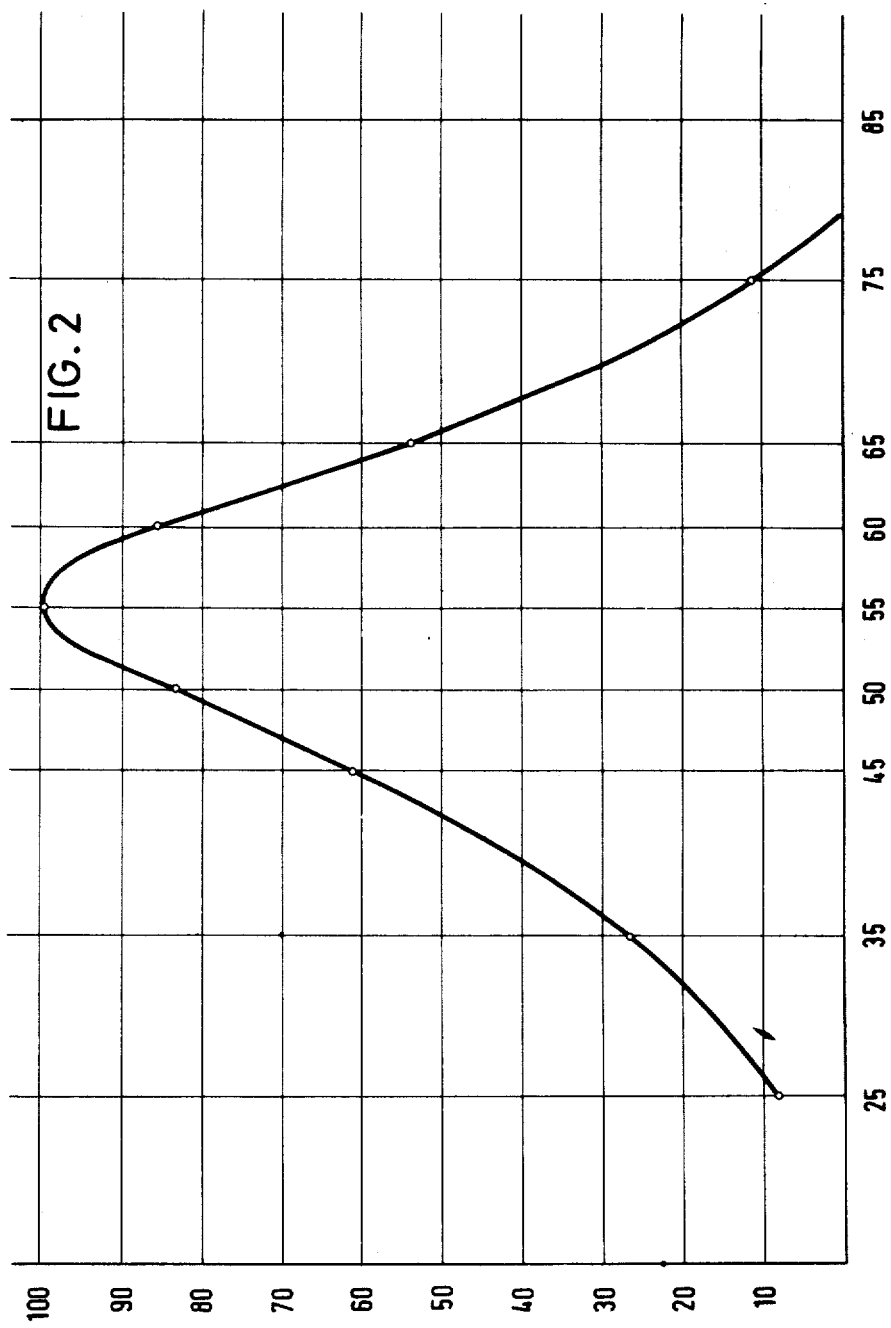

The product of the invention shows the following properties:

| | |
| --- | --- |
| pH optimum | 7 to 8.5; see also FIG. 1 |
| Temperature optimum | 50–60°C; see also FIG. 2 |
| Stability | 45°C: after 60 min in the pH range of 4.5 to 8.5, 100 |

Figure 3:
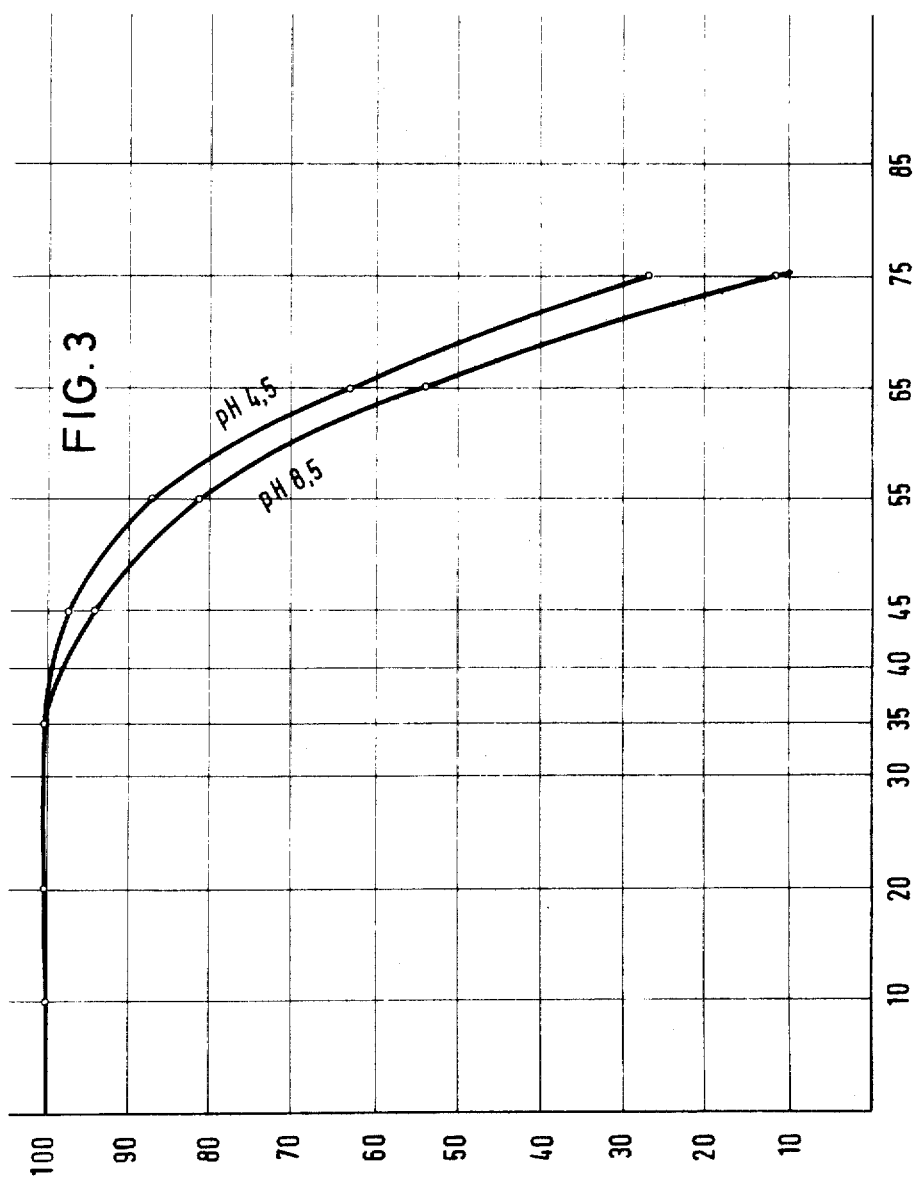
Figure 4:
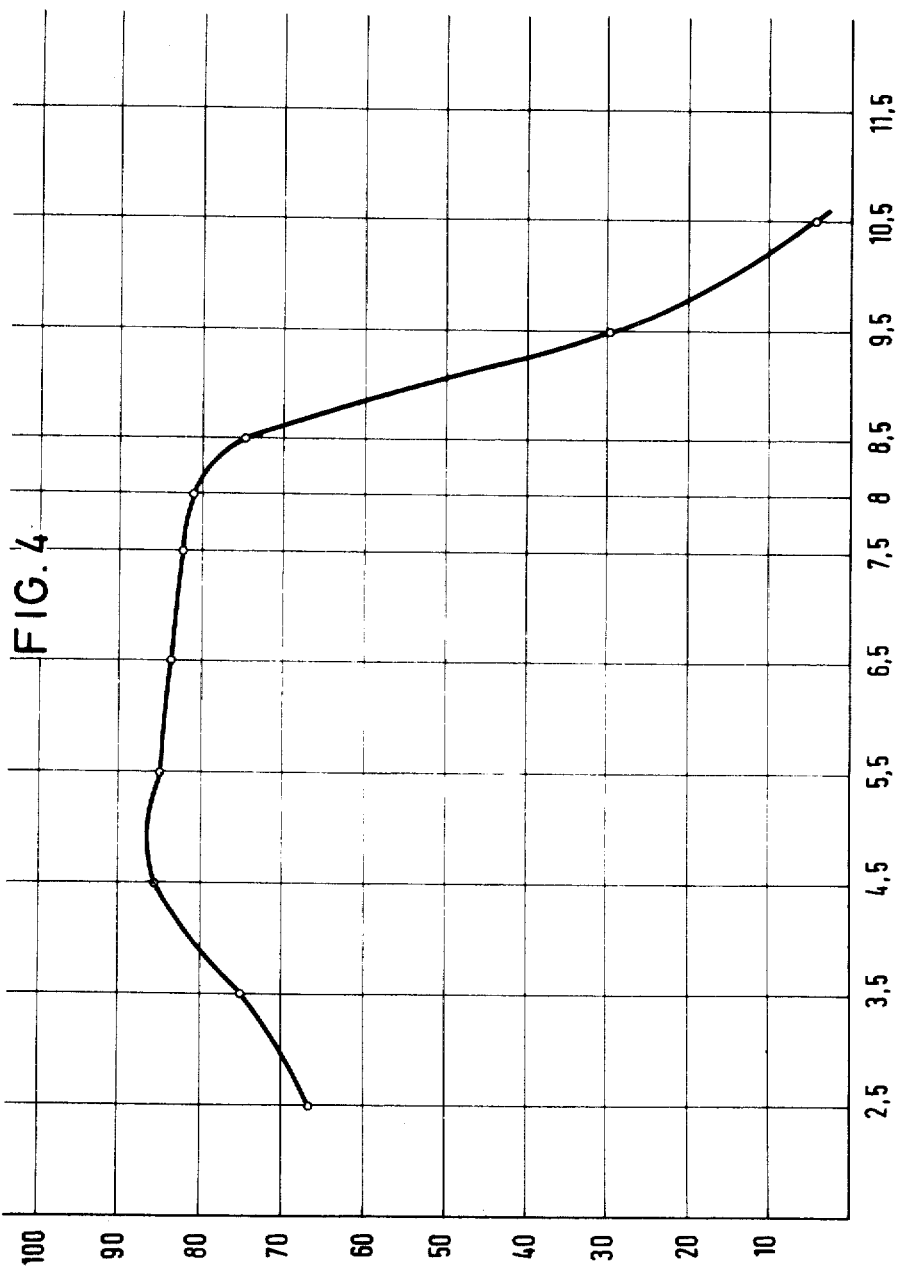

|   |   |
|---|---|
|   | -Continued |
|   | to 95% activity; see also FIG. 3 |
|   | 55°C: after 30 min at a pH value of 4.5, about 85% activity; at a pH value of 8.5, about 80% activity; see also FIG. 4. |
| Solubility | higher solubility in aqueous alkaline media than in aqueous neutral media; insoluble in acetone, ethanol, methanol, and diethyl ether |
| Further properties | Activation by calcium ions and sodium taurocholate; no inhibition of the enzymatic activity by p-hydroxymercuribenzoate; partial inhibition by the sodium salt of ethylenediamine tetraacetic acid. |

The lipolytic activity is measured in the following way: 500 mg of crude enzyme, pulverized in a mortar, are dissolved in citrate-phosphate buffer, pH 8, in a 100-ml volumetric flask, stirred for 20 min at room temperature, and finally brought to the desired volume.

An emulsion containing the substrate is prepared separately. For this purpose a citrate-phosphate buffer, pH 8, containing 2% sodium taurocholate, is mixed with 10% olive oil. The mixture thus obtained is homogenized for 15 min at room temperature.

1 ml of the enzyme solution is freed of insoluble residues by centrifuging and added to 9 ml of the above-mentioned emulsion in a 100-ml Erlenmeyer flask closed with a ground stopper. The substrate-enzyme mixture is shaken in a water bath at 55°C on a reciprocating shaker (stroke about 9 cm, 60 strokes/min). After 1 hour the flask is cooled under tap water. The enzyme reaction is then stopped by the addition of 2 ml of 4 M hydrochloric acid.

The reaction mixture is extracted three times with 25 ml of diethyl ether. The ether extracts are combined, washed 3 times with 15 ml of distilled water each time and titrated with alcoholic 0.02 M potassium hydroxide solution using phenolphthalein as indicator.

A control value is obtained in the same way. For this purpose, however, the enzyme solution is previously heated to 100°C for 20 min to eliminate the lipolytic activity. The control sample too is titrated with alcoholic 0.02 M potassium hydroxide solution using phenolphthalein as indicator.

The specific lipolytic activity of the product in lipolytic units (LU)/mg product is derived from the following equation:

$$LU/mg = A \times 0.02/5$$

in which A is the difference in ml of 0.02 M potassium hydroxide solution consumed. 1 LU is that amount of enzyme which released 1 microequivalent of acid in 1 hour at 55°C and at a pH value of 8.

The lipolytic activity of the fermentation broth is determined according to the above-described manner following separation of the mycelium and other solids.

The invention also concerns the use of the enzyme preparation with lipolytic activity in detergent compositions, chemical productions, e.g. tanning auxiliaries, and drugs, e.g., digestive aids, and for the preparation of foodstuffs, e.g., cheese and chocolate.

The example below illustrates the present invention.

EXAMPLE

For the preparation of an inoculum, strain I.P.V. F-520 is grown for 3 days in two agar slants containing a potato infusion, glucose, and yeast or on agar containing malt. The cultures obtained are rinsed with 10 ml of physiological saline and inoculated into a 750-ml flask containing 100 ml of nutrient medium of the following composition:

| Flour obtained by extraction of soy beans |    | 10   | g  |
|---|---|---|---|
| Maize meal                                |    | 10   | g  |
| Whey powder                               |    | 5    | g  |
| Linseed oil                               |    | 0.5  | g  |
| Tap water                                 | to | 1000 | ml |

Prior to inoculation, the nutrient medium is adjusted to pH 7 and sterilized for one-half hour at 121°C. Before inoculation, it is cooled down to 40°-45°C. The cultivation is carried out for 36 to 38 hours at 40° to 43°C on a reciprocating shaker (120 strokes/min, stroke 8 cm). The fermentation broth from 3 to 5 flask is used as an inoculum for a 10-litre fermentation vessel which contains 5 litres of the above-mentioned nutrient medium. Following 36 hours of incubation at 40° to 43°C while stirring at 500 rpm and an aeration rate of 0.5 litre/litre/min, the fermentation broth obtained is again used in amounts of 10% as the inoculum for fermentation vessels of 20 litre capacity which contain 12 litres of the same nutrient medium. Conditions of cultivation: Temperature 40° to 43°C; stirring rate 500 rpm; aeration rate 0.4 to 0.6 litre/litre/min. A silicone emulsion (Dow Corning antifoam FG-10) is used as an antifoaming agent. The incubation is terminated when a pH value of about 8.5 and a concentration of 200 to 220 LU/ml has been reached after 48 hours of cultivation.

50 litres of fermentation broth obtained in this way are centrifuged in order to separate the mycelium and other insoluble solids. Subsequently, the liquid is adjusted with 1N hydrochloric acid to a pH of 5 to 5.5, and, following the addition of 150 g of tannin in 1000 ml of water, slowly stirred for 60 min at 4°C.

Following this, the liquid is placed in a column where a floccular product precipitates after 4 hours at 4°C. About 10 litres of liquid containing the precipitate are removed from the bottom of the column and centrifuged at 6,000 rpm. The separated precipitate is washed 3 times in a total of 3 litres of acetone, then ground and dried under reduced pressure, at room temperature. 75 g of light-brown, amorphous enzyme powder with a specific activity of 110 LU/mg are obtained. This product has a pH optimum of 7 to 8.5 (see FIG. 1). The temperature optimum lies between 50° and 60°C (see FIG. 2). The product is sufficiently stable for practical purposes, for example for the preparation of detergents, as can be seen in FIGS. 3 and 4.

We claim:

1. Process for preparing an enzyme product with lipolytic activity having optimum activity at 50°-60°C under pH conditions of 7 to 8.5, comprising culturing a microorganism of the genus Myriococcum, ATCC No. 20374, under aerobic conditions in an aqueous culturing medium comprising a carbon source, a nitrogen source and a mineral salt, for 48-90 hours at a pH value of 7 to 8.5 at a temperature of 38°C to 45°C, under agitation and with an aeration rate of 0.2 to 1 litre/litre/minute.

2. Process as claimed in claim 1, wherein the carbon source is selected from the group consisting of starch, dextrin, maltose, lactose; carbohydrates from maize, soy beans, peanuts, cotton seed, cereal bran, whey; filter cakes from production of vegetal oils; molasses.

3. Process as claimed in claim 1, wherein the nitrogen source is selected from the group consisting of proteins, protein hydrolysates and inorganic salts containing nitrogen.

4. Process as claimed in claim 1, wherein the mineral salt is selected from the group consisting of phosphates, magnesium sulphate, zinc sulphate and calcium chloride.

5. Process as claimed in claim 1, wherein, after termination of the cultivation, the liquid phase of the culture broth is collected and the enzyme product is precipitated therefrom.

6. Process as claimed in claim 5, wherein the precipitation is carried out by treatment with a member of the group consisting of ammonium sulphate, chlorides, tannin, acetone and ethanol.

* * * * *